(12) United States Patent
Wu et al.

(10) Patent No.: US 11,000,860 B2
(45) Date of Patent: May 11, 2021

(54) SHOWER FACILITY OPERATED BY WIRELESS REMOTE CONTROL DEVICE

(71) Applicant: Purity (Xiamen) Sanitary Ware Co., Ltd., Xiamen (CN)

(72) Inventors: James Wu, Taichung (TW); Alex Wu, Taichung (TW); Ce-Wen Yang, Xiamen (CN)

(73) Assignee: PURITY (XIAMEN) SANITARY WARE CO., LTD., Xiamen (CN)

( * ) Notice: Subject to any disclaimer, the term of this patent is extended or adjusted under 35 U.S.C. 154(b) by 111 days.

(21) Appl. No.: 16/232,971

(22) Filed: Dec. 26, 2018

(65) Prior Publication Data
US 2020/0206752 A1    Jul. 2, 2020

(51) Int. Cl.
*B05B 1/18* (2006.01)
*F16K 31/46* (2006.01)
*B05B 1/16* (2006.01)

(52) U.S. Cl.
CPC ............... *B05B 1/18* (2013.01); *B05B 1/169* (2013.01); *F16K 31/46* (2013.01)

(58) Field of Classification Search
CPC ............ B05B 1/18; B05B 1/169; F16K 31/46

USPC .................................................. 239/443–449
See application file for complete search history.

(56) References Cited

U.S. PATENT DOCUMENTS 8,424,779 B2 *   4/2013   Li ........................ B05B 1/1609
                                                              239/289

\* cited by examiner

*Primary Examiner* — Christopher S Kim
(74) *Attorney, Agent, or Firm* — Birch, Stewart, Kolasch & Birch, LLP

(57) ABSTRACT

A shower facility includes a shower assembly and a wireless remote control device. The shower assembly includes a hydroelectricity device and an outlet control device electrically connected to the hydroelectricity device, wherein the hydroelectricity device could provide electricity to the outlet control device. The hydroelectricity device has an inlet opening, and the outlet control device has at least three outlet openings. The wireless remote control device is signal-connected to the shower assembly. When the wireless remote control device is operated to transmit an operating signal to the shower assembly, the outlet control device would receive the operating signal to control the opening and closing of the outlet openings, and one of the outlet openings communicates with the inlet opening.

17 Claims, 6 Drawing Sheets

SHOWER FACILITY OPERATED BY WIRELESS REMOTE CONTROL DEVICE

BACKGROUND OF THE INVENTION

1. Technical Field

The present disclosure relates generally to a shower, and more particularly to a shower facility operated by a wireless remote control device.

2. Description of Related Art

A conventional shower is a place in which a person bathes under a spray of typically warm or hot water. The conventional showers usually have adjustable a showerhead. The simplest showers have a nozzle aiming down on the user, while more complex showers have a hand shower connected to a hose that has a mounting bracket. This allows users to hold the hand shower by hand to spray the water at different parts of their body.

However, the conventional showers are not convenient to change outlet functions for children, elders and handicapped individuals during a shower because a functional operator usually positioned on the shower head connected to the shower head is too high for them to change outlet functions of the shower head. Therefore, physically handicapped or injured individuals may be incapable of manipulating the functional operator of the conventional showers.

Furthermore, the conventional shower stalls present a risk of injury in use. Each year, numerous children, handicapped individuals, and even normal people slip and fall and injure themselves before, during, or after bathing. The risks associated with bathing become markedly greater for children and the elderly or physically handicapped.

Accordingly, it would be highly desirable to provide shower facilities which reduce the risk of injury for children, elderly people and handicapped individuals during a shower. Besides, what is needed is a shower facility being convenient to change outlet functions for children, elders and handicapped individuals during a shower.

At least for the above reasons, the conventional showers still have room for improvements.

BRIEF SUMMARY OF THE INVENTION

In view of the above, the primary objective of the present disclosure is to provide a shower facility having a wireless remote control device, which is convenient to change outlet functions for children, elders and handicapped individuals during a shower.

The present disclosure provides a shower facility including a shower assembly and a wireless remote control device. The shower assembly includes a hydroelectricity device and an outlet control device electrically connected to the hydroelectricity device, wherein the hydroelectricity device could provide electricity to the outlet control device. The hydroelectricity device has an inlet opening, and the outlet control device has at least three outlet openings. The wireless remote control device is signal-connected to the shower assembly. When the wireless remote control device is operated to transmit an operating signal to the shower assembly, the outlet control device would receive the operating signal to control the opening and closing of the outlet openings, and one of the outlet openings communicates with the inlet opening.

With the aforementioned design, the hydroelectricity device of the shower assembly could provide electricity to the outlet control device, and the wireless remote control device is signal-connected to the shower assembly in order to control the opening and closing of the outlet openings.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
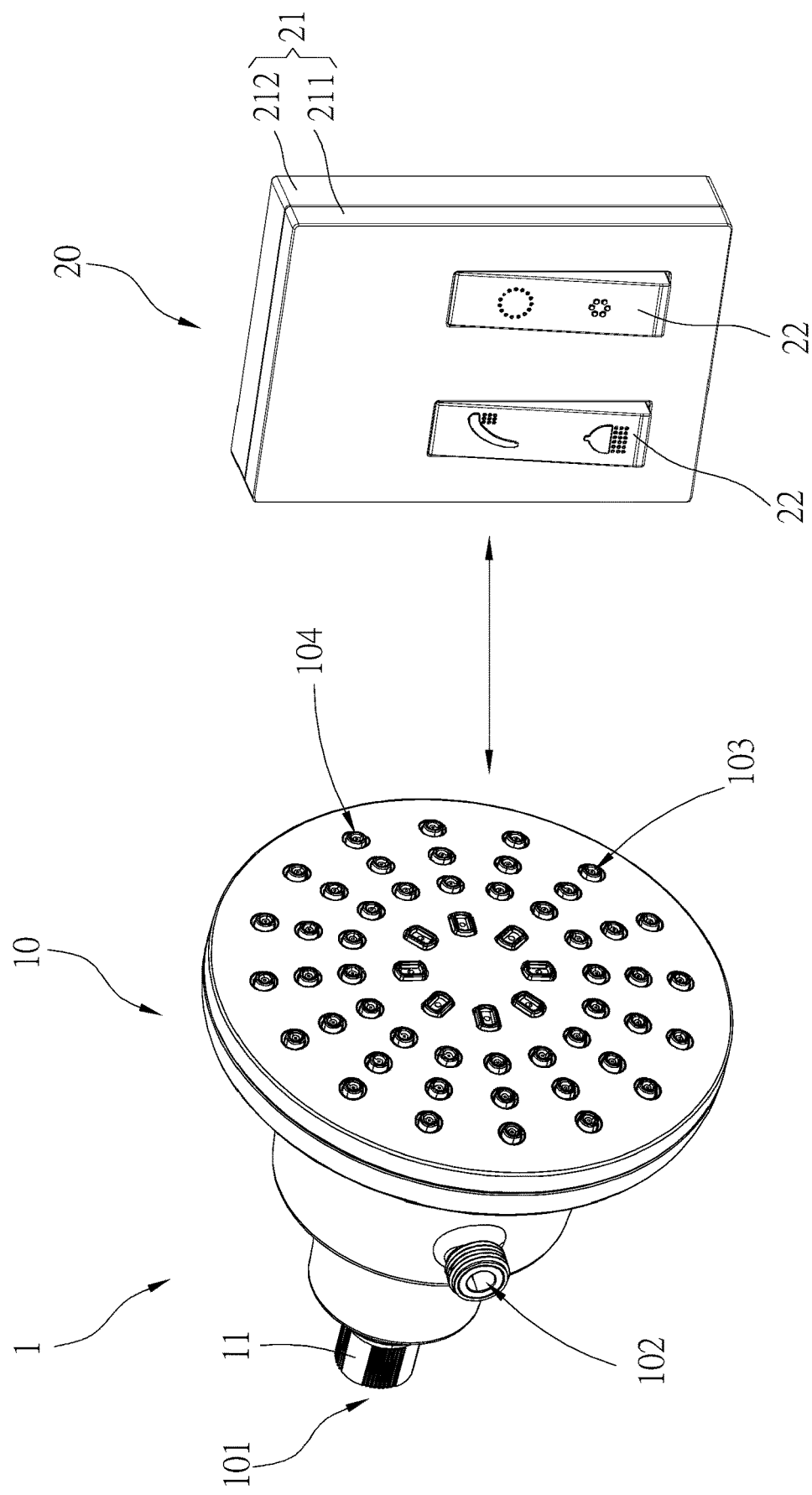
FIG. 1 is a perspective view of a shower facility of one embodiment of the present disclosure.

As illustrated in FIG. 1 to FIG. 6, a shower facility 1 is provided, including a shower assembly 10 and a wireless remote control device 20. The shower assembly 10, includes a hydroelectricity device 12 and an outlet control device 15, wherein the outlet control device 15 is electrically connected to the hydroelectricity device 12. The hydroelectricity device 12 could provide electricity to the outlet control device 15.

In FIG. 1, the shower assembly 10 has an inlet opening 101 and three outlet openings 102, 103, 104. In addition, the wireless remote control device 20 is signal-connected to the shower assembly 10. When the wireless remote control device 20 is operated to transmit an operating signal to the shower assembly 10, the outlet control device 15 would receive the operating signal to control the opening and closing of the outlet openings 102, 103, 104, and one of the outlet openings 102, 103, 104 communicates with the inlet opening 101.

Figure 2:
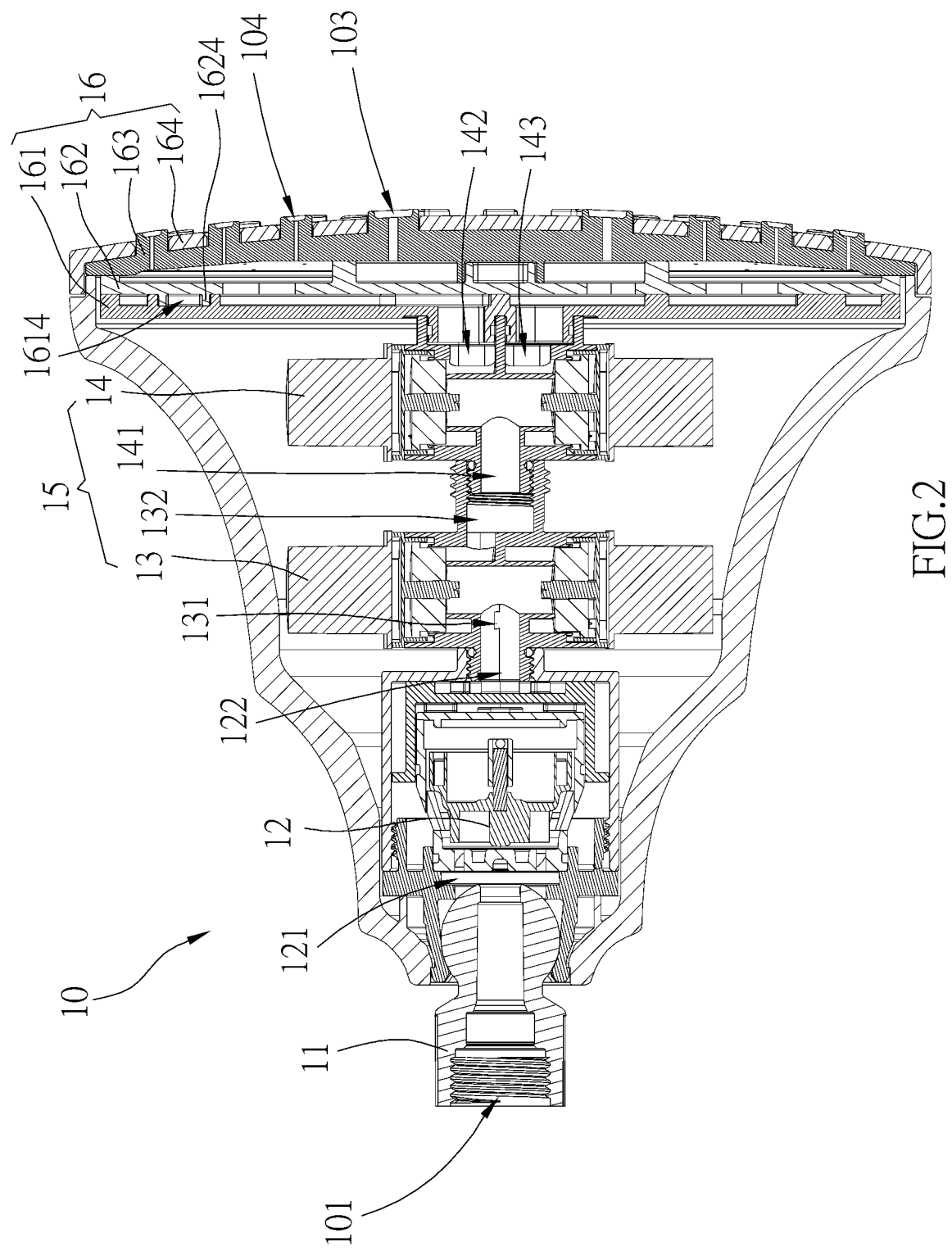
FIG. 2 is a cross-sectional view of a shower head of the shower facility of one embodiment of the present disclosure.
Figure 4:
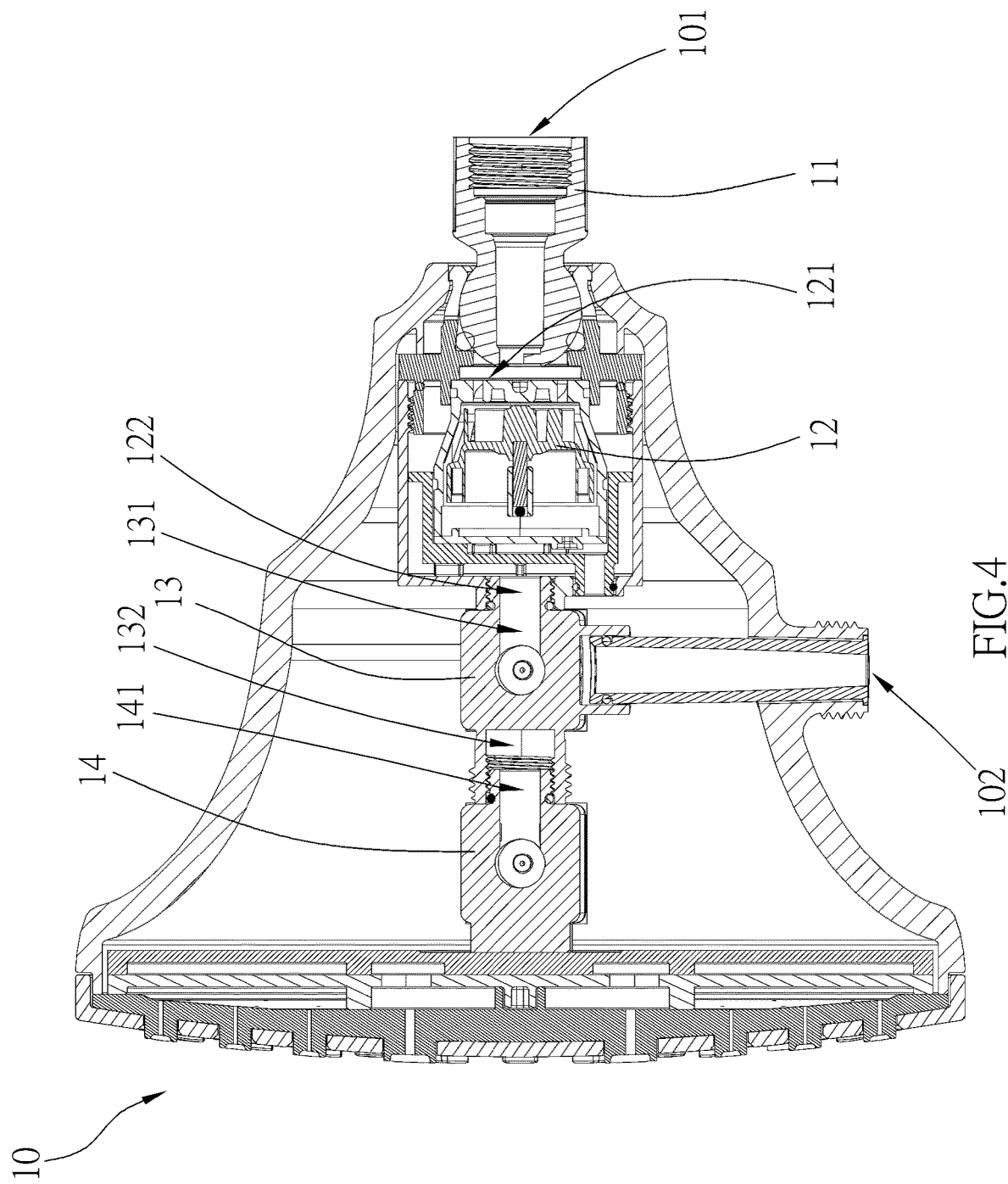
FIG. 4 is another cross-sectional view of the shower head of the shower facility of one embodiment of the present disclosure.

Referring to FIG. 2 and FIG. 4, the hydroelectricity device 12 has the inlet opening 101, and the outlet control device 15 has the outlet openings 102, 103, 104. In detail, the outlet control device 15 includes at least one of the electrically controlled valves connected to and communicating with the hydroelectricity device 12. In one embodiment of the present disclosure, the outlet control device 15 has two electrically controlled valves 13, 14 connected to and communicating with the hydroelectricity device 12. In one embodiment of the present disclosure, the hydroelectricity device 12 and the electrically controlled valves 13, 14 are arranged linearly. Furthermore, the electrically controlled valves 13, 14 could receive the operating signal to control the opening and closing of the outlet openings 102, 103, 104 while the wireless remote control device 20 is operated.

In FIG. 2, and FIG. 4, the electrically controlled valves 13, 14 includes a first valve 13 and a second valve 14, wherein the first valve 13 is positioned between the hydroelectricity device 12 and the second valve 14. In one embodiment of the present disclosure, the first valve 13 has an first inlet opening 131 and a plurality of first outlet openings 102, 132, wherein the first inlet opening 131 of the first valve 13 is connected to an outlet opening 121 of the hydroelectricity device 12, and one of the first outlet openings 132 of the first valve 13 is connected to an inlet opening 141 of the second valve 14. In one embodiment of the present disclosure, the outlet opening 102 of the first valve 13 is connected to a hand shower (not shown) or a resining pipe (not shown).

In one embodiment of the present disclosure, when the wireless remote control device 20 is operated, the first valve 13 could receive the operating signal to control the opening and closing of the first outlet openings 102, 132. In one embodiment of the present disclosure, when the wireless remote control device 20 is operated, at least one of the first outlet openings 102 or 132 of the first valve 13 is open to communicate with the inlet opening 131 of the first valve 13. In other words, when the wireless remote control device 20 is operated, the first outlet opening 132 of the first valve 13 is open to communicate with the inlet opening 131 of the first valve 13 while the first outlet opening 102 of the first valve 13 is closed; or, the first outlet opening 102 of the first valve 13 is open to communicate with the inlet opening 131 of the first valve 13 while the first outlet opening 132 of the first valve 13 is closed. In one embodiment of the present disclosure, when the wireless remote control device 20 is operated, all the first outlet openings 102, 132 of the first valve 13 are open. In one embodiment of the present disclosure, when the wireless remote control device 20 is operated, flow rates of all the first outlet openings 102, 132 of the first valve 13 are slowed down to be paused.

Figure 3:
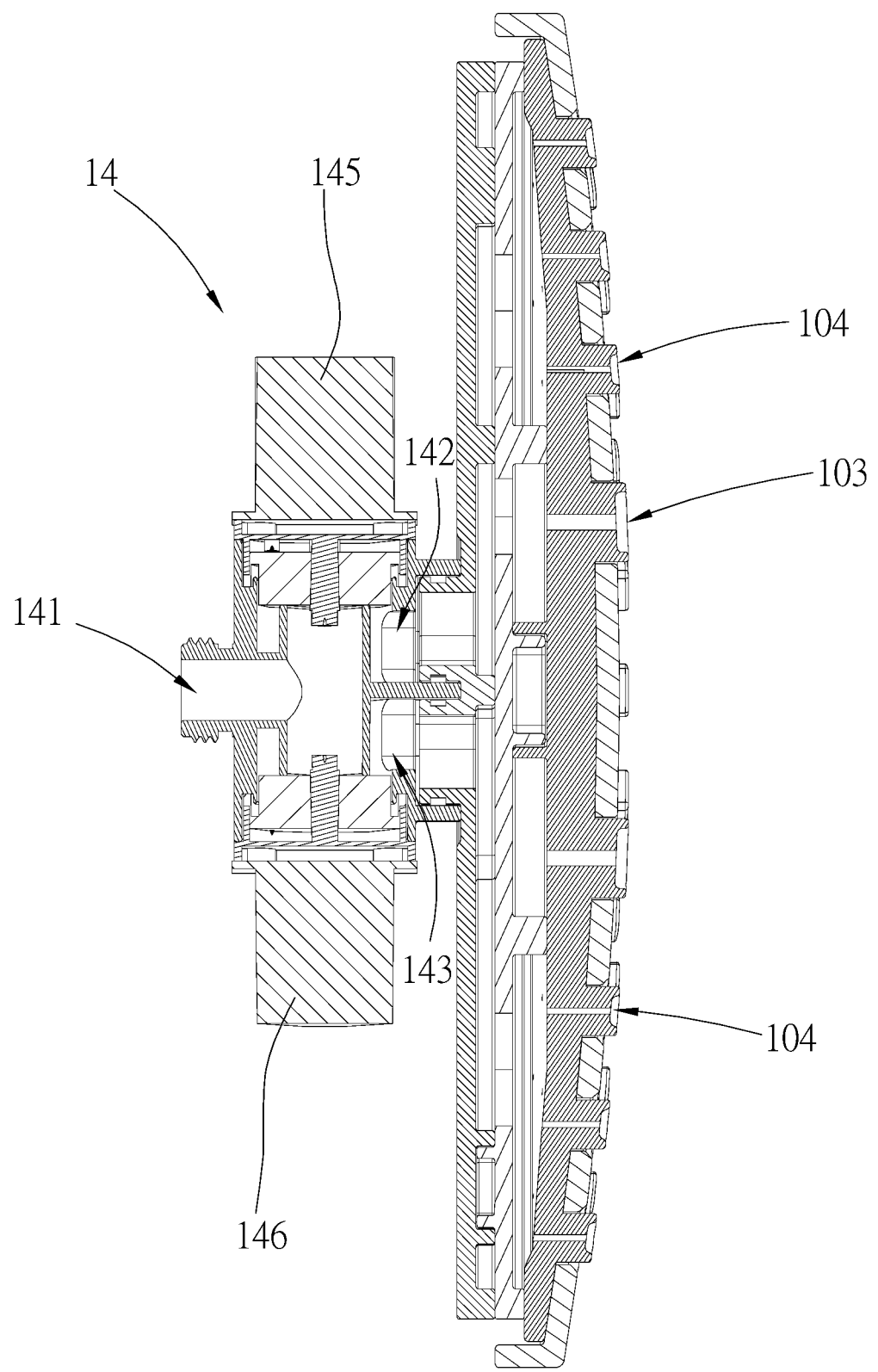
FIG. 3 is a partial enlarged view of FIG. 2.

In FIG. 2 to FIG. 4, the shower facility 1 includes a spray member 16 connected to and communicating with the second valve 14. In one embodiment of the present disclosure, the second valve 14 has a plurality of second outlet openings 142, 143, and the spray member has a plurality of outlet portions 1631, 1632. In one embodiment of the present disclosure, the second outlet openings 142, 143 individually communicate with the outlet portions 1631, 1632 of the spray member 16. In one embodiment of the present disclosure, when the wireless remote control device 20 is operated, at least one of the second outlet openings 142 or 143 of the second valve 14 is open to communicate with the inlet opening 141 of the second valve 14. In other words, when the wireless remote control device 20 is operated, the second outlet openings 142 of the second valve 14 is open to communicate with the inlet opening 141 of the second valve 14 while the second outlet openings 143 of the second valve 14 is closed; or, the second outlet openings 143 of the second valve 14 is open to communicate with the inlet opening 141 of the second valve 14 while the second outlet openings 142 of the second valve 14 is closed. In one embodiment of the present disclosure, when the wireless remote control device 20 is operated, all the second outlet openings 142, 143 of the second valve 13 are open. In one embodiment of the present disclosure, when the wireless remote control device 20 is operated, flow rates of all the second outlet openings 142, 143 of the second valve 13 are slowed down to be paused. In one embodiment of the present disclosure, the outlet portion 1631 of the spray member 16 is positioned close to a center of the spray member 16, and the out let portion 1632 thereof is positioned away from the center thereof.

Figure 5:
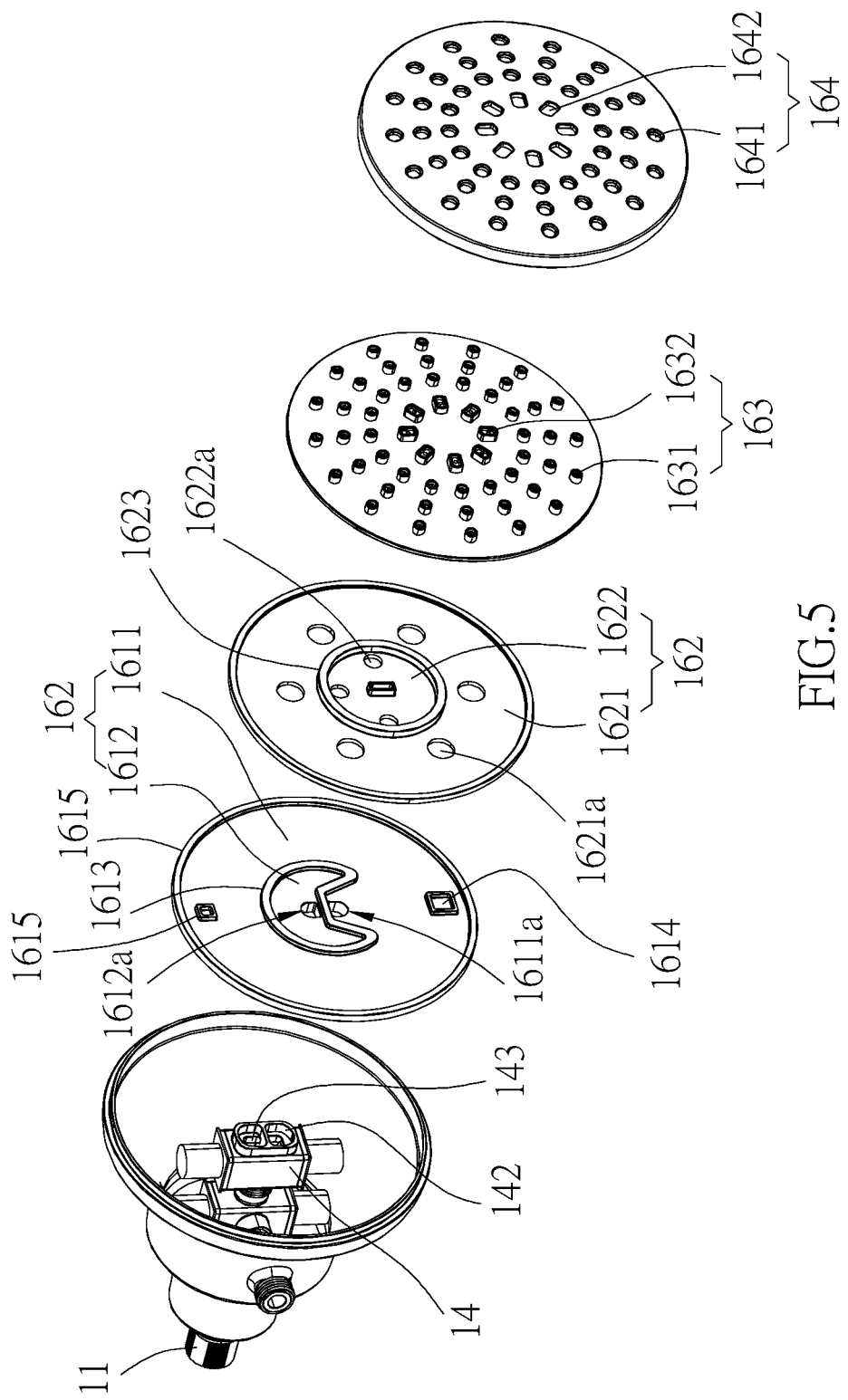
FIG. 5 is a partial exploded view of the shower head of the shower facility of one embodiment of the present disclosure.

In FIG. 2 and FIG. 5, the spray member 16 includes a first unit 161, a second unit 162, a third unit 163 and a fourth unit 164, wherein the first unit 161, the second unit 162, the third unit 163 and the fourth unit 164 are sequentially and co-axially connected to each other, and the first unit 161 is connected to and communicates with the second valve 14. It is worthy to note that, the first unit 161 includes a first flow area 1611 and a second flow area 1612, wherein the first flow area 1611 and the second flow area 1612 are independently separated from each other by a sealing ring 1613. A through hole 1611a located in the first flow area 1611 communicates with the second outlet opening 142 while a through hole 1612a located in the second flow area 1612 communicates with the second outlet opening 143.

The second unit 162 includes a first flow area 1621 and a second flow area 1622, wherein the first flow area 1621 and the second flow area 1622 are independently separated from each other by a sealing ring 1623, and the first flow area 1621 is corresponding to the first flow area 1611 of the first unit 161 while the second flow area 1622 is corresponding to the second flow area 1612 of the first unit 161. A plurality of through hole 1621a located in the first flow area 1621 communicates with the through hole 1611a of the first unit 161 while a plurality of through hole 1622a located in the second flow area 1622 communicates with the through hole 1612a of the first unit 161.

The third unit 163 includes a first outlet portion 1631 and a second outlet portion 1632, wherein the first outlet portion 1631 is corresponding to the first flow area 1621 of the second unit 162 while the second outlet portion 1632 is corresponding to the second flow area 1622 of the second unit 162. A plurality of outlet bores located in the first outlet portion 1631 communicates with the through hole 1621a of the second unit 162 while a plurality of outlet bores located in the second outlet portion 1632 communicates with the through hole 1622a of the second unit 162.

The fourth unit 164 includes a first portion 1641 and a second portion 1642, wherein the first portion 1641 is corresponding to the first outlet portion 1631 of the third unit 163 while the second portion 1642 is corresponding to the second outlet portion 1632 of the third unit 163. A plurality of bores located in the first portion 1641 are respectively corresponding to the outlet bores of the first outlet portion 1631 of the third unit 163 while a plurality of bores located in the second portion 1642 are respectively corresponding to the outlet bores of the second outlet portion 1632 of the third unit 163.

In one embodiment of the present disclosure, the first unit 161 includes a first recess 1614 and a second recess 1615, and the second unit 162 includes a protrusion 1624, wherein a recess size of the first recess 1614 is greater than that of the second recess 1615, and the protrusion 1624 is fitted into the first recess 1614, but cannot be fitted into the second recess 1615, whereby it can ensure that the first flow area 1621 of the second unit 162 is correspondingly connected to the first flow area 1611 of the first unit 161 while the second flow area 1622 of the second unit 162 is correspondingly connected to the second flow area 1612 of the first unit 161.

In FIG. 1 to FIG. 5, the shower facility 1 includes an inlet connector 11 positioned between the shower assembly 10 and a fixed member (not shown), wherein the inlet connector 11 is fixedly mounted on the fixed member (e.g., a wall or a rigid pipe). In one embodiment of the present disclosure, one end opening of the inlet connector 11 communicates with the shower assembly 10, and another end opening (i.e., the inlet opening 101) communicates with an inlet pipe (not shown) of the fixed member. In one embodiment of the present disclosure, the inlet connector 11 is connected to the hydroelectricity device 12, and communicates with the inlet opening 121 of the hydroelectricity device 12. In one embodiment of the present disclosure, the inlet connector 11 has a universal joint which is connected to the hydroelectricity device 12, and one of the end openings of the inlet connector 11 is positioned on the universal joint, communicating with the inlet opening 121 of the hydroelectricity device 12.

Figure 6:
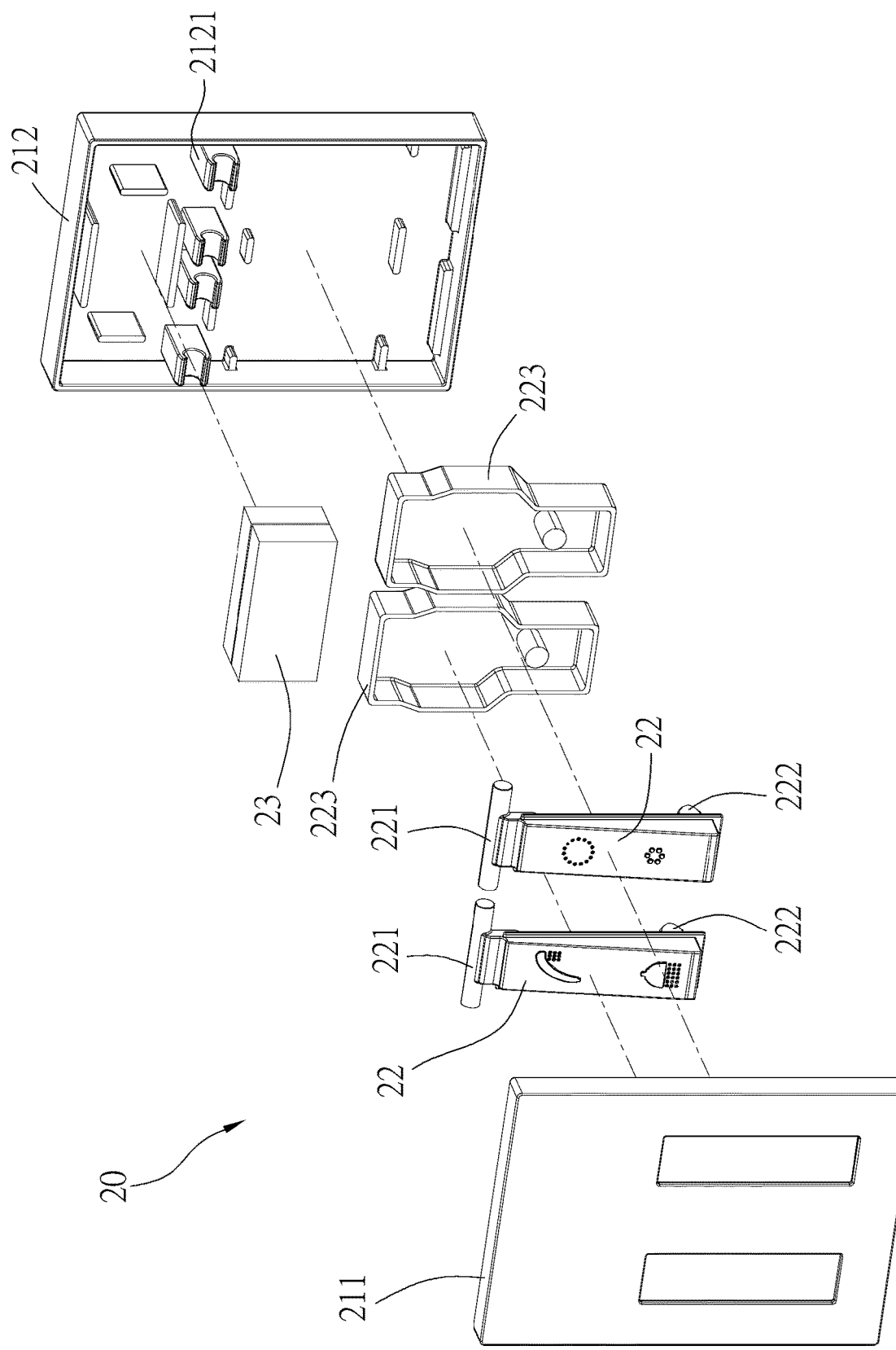
FIG. 6 is an exploded view of a wireless remote control device of the shower facility of one embodiment of the present disclosure.

In FIG. 1 and FIG. 6, the wireless remote control device 20 includes an operating interface 22 and a transmitter 23 electrically connected to the operating interface 22. When the operating interface 22 is operated, the transmitter 23 would transmit the operating signal to the shower assembly 10. In one embodiment of the present disclosure, the wireless remote control device 20 includes a case 21, and the operating interface 22 and the transmitter 23 are positioned in the case 21. The operating interface 22 includes two electricity generators 223 and two buttons 22, the buttons 22 are respectively connected to the electricity generators 223. When one of the buttons 22 is pressed, one of the electricity generators 223 is actuated to produce power providing to the transmitter 23, and the transmitter 23 would transmit the operating signal to the shower assembly 10. In one embodiment of the present disclosure, the wireless remote control device 20 is battery-free because the wireless remote control device 20 includes the electricity generators 223 to produce an electric power to the transmitter 23.

In one embodiment of the present disclosure, the operating interface 22 includes a spring 222 connected to the button 22. When one of the buttons 22 is pressed by an external force, the spring 222 is compressed. When the external force is removed, one of the buttons 22 would be moved to an original position by a returning force of the spring 222. In one embodiment of the present disclosure, each of the button 22 has a pivoting shaft 221 at one end of the button 22, and the case 21 has a front unit 211, a rear unit 212 and a supporting base 2121 positioned in the rear unit 212. A part of the button 22 protrudes from a hole of the front unit 211. The pivoting shaft 221 is positioned on the supporting base 2121, and the button 22 could be operated to pivot outward and inward relative to the case 21.

With the aforementioned design, the hydroelectricity device of the shower assembly could provide electricity to the outlet control device, and the wireless remote control device is signal-connected to the shower assembly. When the wireless remote control device is operated to transmit an operating signal to the shower assembly, the outlet control device would receive the operating signal to control the opening and closing of the outlet openings, and one of the outlet openings communicates with the inlet opening.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A shower facility comprising:
 a shower assembly comprising a hydroelectricity device and an outlet control device electrically connected to the hydroelectricity device, wherein the hydroelectricity device is adapted to provide electricity to the outlet control device; the hydroelectricity device has an inlet opening, and the outlet control device has at least three outlet openings; and
 a wireless remote control device signal-connected to the shower assembly, wherein when the wireless remote control device is operated to transmit an operating signal to the shower assembly, the outlet control device receives the operating signal to control the at least three outlet openings to either open or close, and one of the at least three outlet openings communicates with the inlet opening;
 wherein the outlet control device comprises a plurality of electrically controlled valves connected to and communicating with the hydroelectricity device; the plurality of electrically controlled valves comprises a first valve and a second valve, wherein the first valve is disposed between the hydroelectricity device and the second valve in an axial direction of the inlet opening; the first valve is adapted to receive water coming from the hydroelectricity device, and the second valve is adapted to receive water coming from the first valve; the first valve has one of the at least three outlet openings, and the second valve communicates with the other two of the at least three outlet openings; the plurality of electrically controlled valves are adapted to receive the operating signal to control the at least three outlet openings to either open or close while the wireless remote control device is operated.

2. The shower facility of claim 1, wherein the hydroelectricity device and the plurality of electrically controlled valves are arranged linearly.

3. The shower facility of claim 1, wherein the first valve has a first inlet opening and an outlet connected to an inlet opening of the second valve; the outlet and one of the at least three outlet openings of the first valve which does not communicate with the second valve constitutes a plurality of first outlet openings; the first inlet opening of the first valve is connected to an outlet opening of the hydroelectricity device.

4. The shower facility of claim 3, wherein when the wireless remote control device is operated, the first valve receives the operating signal to control the plurality of first outlet openings to either open or close.

5. The shower facility of claim 4, wherein when the wireless remote control device is operated, at least one of the plurality of first outlet openings is open to communicate with the inlet opening of the first valve, all the plurality of first outlet openings are open, or flow rates of all the plurality of first outlet openings are slowed down to be paused.

6. The shower facility of claim 1, further comprising a spray member connected to and communicating with the second valve.

7. The shower facility of claim 6, wherein the second valve has two second outlet openings communicating with the other two of the at least three outlet openings, and the spray member has two outlet portions and communicates with the second valve via the two second outlet openings; each of the two second outlet openings individually communicate with one of the two outlet portions of the spray member.

8. The shower facility of claim 7, wherein when the wireless remote control device is operated, at least one of the two second outlet openings of the second valve is open to communicate with an inlet opening of the second valve, both of the two second outlet openings of the second valve are open, or flow rates of both of the two second outlet openings of the second valve are slowed down to be paused.

9. The shower facility of claim 7, wherein one of the two outlet portions of the spray member is positioned closer to a center of the spray member than the other one of the two outlet portions thereof.

10. The shower facility of claim 7, wherein the spray member comprises a first unit connected to and communicating with the second valve; the first unit comprises a first flow area and a second flow area, wherein the first flow area and the second flow area are independently separated from each other by a sealing ring.

11. The shower facility of claim 10, wherein the first unit has a through hole located in the first flow area communicating with one of the plurality of second outlet openings of the second valve; another through hole of the first unit located in the second flow area communicates with another one of the plurality of second outlet openings of the second valve.

12. The shower facility of claim 1, further comprising an inlet connector positioned between the shower assembly and a fixed member, wherein the inlet connector is fixedly mounted on the fixed member; an end opening of the inlet connector communicates with the shower assembly, and another end opening communicates with an inlet pipe of the fixed member.

13. The shower facility of claim 12, wherein the inlet connector is connected to the hydroelectricity device and communicates with the inlet opening of the hydroelectricity device.

14. The shower facility of claim 13, wherein the inlet connector has a universal joint which is connected to the hydroelectricity device, and one of the end openings of the inlet connector is positioned on the universal joint, communicating with the inlet opening of the hydroelectricity device.

15. The shower facility of claim 1, wherein the wireless remote control device comprises an operating interface and a transmitter electrically connected to the operating interface; when the operating interface is operated, the transmitter transmits the operating signal to the shower assembly.

16. The shower facility of claim 15, wherein the wireless remote control device comprises a case, the operating interface and the transmitter are positioned in the case; the operating interface comprises an electricity generator and a button; the button is connected to the electricity generator; when the button is pressed, the electricity generator is actuated to produce power providing to the transmitter, and the transmitter transmits the operating signal to the shower assembly.

17. The shower facility of claim 16, wherein the operating interface comprises a spring connected to the button; when the button is pressed by an external force, the spring is compressed; when the external force is removed, the button is moved to an original position by a returning force of the spring.

* * * * *